(12) United States Patent
Choyi et al.

(10) Patent No.: US 7,676,838 B2
(45) Date of Patent: Mar. 9, 2010

(54) SECURE COMMUNICATION METHODS AND SYSTEMS

(75) Inventors: Vinod Choyi, Ottawa (CA); Andrew Robison, Woodlawn (CA); Frederic Gariador, Ottawa (CA)

(73) Assignee: Alcatel Lucent, Paris (FR)

( * ) Notice: Subject to any disclaimer, the term of this patent is extended or adjusted under 35 U.S.C. 154(b) by 1136 days.

(21) Appl. No.: 10/899,251

(22) Filed: Jul. 26, 2004

(65) Prior Publication Data

US 2006/0020787 A1    Jan. 26, 2006

(51) Int. Cl.
*G06F 9/00* (2006.01)

(52) U.S. Cl. ...................................... 726/14
(58) Field of Classification Search .................. 726/14
See application file for complete search history.

(56) References Cited

U.S. PATENT DOCUMENTS

| | | | |
|---|---|---|---|
| 6,377,982 B1 * | 4/2002 | Rai et al. ................... | 709/217 |
| 2001/0047487 A1 * | 11/2001 | Linnakangas et al. ....... | 713/201 |
| 2002/0091921 A1 | 7/2002 | Kunzinger | |
| 2002/0129236 A1 * | 9/2002 | Nuutinen ................... | 713/151 |
| 2003/0191963 A1 | 10/2003 | Balissat et al. | |
| 2004/0120328 A1 | 6/2004 | Adrangi et al. | |
| 2004/0192309 A1 * | 9/2004 | Watanabe et al. .......... | 455/439 |

OTHER PUBLICATIONS

European Telecommunications Standards Institute, "Digital cellular telecommunications system (Phase 2+); Universal Mobile Telecommunications System (UMTS); 3G Security; Access security for IP-based services (3GPP TS 33.203 version 5.7.0 Release 5)", 3rd Generation Partnership Project, ETSI TS 133 203 V5.7.0, Sep. 2003.*
Devaraj Das, "IPSec-based Delegation Protocol and its Application", Distributed Computing Systems, 2004, Proceedings, FTDCS 2004, 10th IEEE Internat'l. Workshop on Future . . . .
Jeremy De Clercq et al., "BGP/IPsec VPN", IETF Standard Working Draft, Internet Engineering Task Force, IETF, CH, No. 1, Feb. 2001, XPO15012355, ISSN: 0000-0004.
European Telecommunications Standards Institute, Digital cellular telecommunications system (Phase 2+); Universal Mobile Telecommunications System (UMTS); 3G Security; Access security.

* cited by examiner

*Primary Examiner*—Jacob Lipman
(74) *Attorney, Agent, or Firm*—Eckert, Seamans, Cherin & Mellot

(57) ABSTRACT

Methods and systems for secure communications are provided. Secure end-to-end connections are established as separate multiple secure connections, illustratively between a first system and an intermediate system and between a second system and an intermediate system. The multiple secure connections may be bound, by binding Internet Protocol Security Protocol (IPSec) Security Associations (SAs) for the multiple connections, for example, to establish the end-to-end connection. In the event of a change in operating conditions which would normally require the entire secure connection to be re-established, only one of the multiple secure connections which form the end-to-end connection is re-established. Separation of end-to-end connections in this manner may reduce processing resource requirements and latency normally associated with re-establishing secure connections.

24 Claims, 5 Drawing Sheets

SECURE COMMUNICATION METHODS AND SYSTEMS

FIELD OF THE INVENTION

This invention relates generally to communications and, in particular, to secure communications.

BACKGROUND

Internet Protocol Security (IPSec) Protocol provides for secure communications over inherently insecure networks, for secure Virtual Private Network (VPN) services, for example. Secure communication using IPSec involves negotiating security parameters using IPSec messages and then establishing IPSec Security Associations (SAs) between IPSec clients at an access system and a host system or a security gateway. The process is normally initiated by the access system and requires prior knowledge of an address of the host system or security gateway and either a pre-shared key or mutual public key certificates between the client and the host or gateway.

Security parameter negotiation is typically performed using the Internet Key Exchange (IKE) protocol and consists of two phases. Phase one is the process of creating a secure tunnel for IPSec SA negotiation and is identified by the Internet Security Association and Key Management Protocol (ISAKMP) SA. The second phase is the Authentication Header (AH) or Encapsulating Security Protocol (ESP) SA negotiation process, depending upon the data security services to be supported. IPSec AH provides for data authentication but not protection. ESP, on the other hand, protects data.

The ISAKMP SA negotiation is used to agree upon security attributes such as an encryption algorithm, a hash algorithm for signing, and an authentication method, and for Diffie-Hellman (DH) key exchange. The access system initiates negotiations, which are completed once mutual keys have been derived at both the access system and the host or gateway and upon the verification of the identity of the two parties.

IKE phase two is performed by using the ISAKMP SA to negotiate ESP SAs which will protect actual data traffic, for example. Again, the IPSec client at the access system initiates, keys are agreed upon, and the SAs are created, one for each direction. Each SA is uniquely identified by a Security Parameter Index (SPI).

User traffic originating at the access system or at the host system or a system associated with the security gateway is protected by an SA that is identified by the specific SPI. As described above, two SAs are created for 2-way communication. Any time a network address of an access system changes, where the access system is a mobile communication device and a handoff is made to a new location which assigns the access system a different network address, the IPSec SAs must be re-negotiated.

IPSec was designed primarily for fixed networks and therefore is not very "mobile friendly". Some of the primary drawbacks of IPSec for application to clients on mobile communication devices include latency and resource burden. Latency involved in re-negotiation of IPSec SAs every time a network layer handoff is performed can lead to substantial loss of data, and potentially greater impact in the case of real-time services. In addition, depending upon the frequency of handoffs, the amount of overhead and processing required for creating and re-negotiating SAs by a host system or security gateway could potentially be very large, which may occupy or overload available resources.

One mechanism which avoids having to re-negotiate SAs every time a handoff occurs is to have an IPsec client, operating on a mobile communication device, for example, create SAs using a permanent home address as one of the endpoints of the SAs instead of an obtained IP address. This ensures that SAs do not have to be re-negotiated, since the client used its permanent identity to create the SAs even though a new address is obtained every time a handoff is performed. The main drawback of this approach is that traffic now would be routed via the mobile device's home network and then re-routed to the access network where the device is located. This causes not only increased traffic to the home network but also inefficient routing (not shortest path) in both the directions. Depending upon the IPSec mode used, this technique can cause lot of wireless resource consumption because of multiple-tunnelling.

SUMMARY OF THE INVENTION

Mechanisms for reducing signaling latencies in accordance with embodiments of the invention enable secure communications for real-time services to be provided for roaming mobile communication devices. In one possible application, secure remote access to a corporate network through a secure VPN connection may be provided for roaming and mobile corporate users.

According to one aspect of the invention, a communication method is provided, and includes establishing respective Internet Protocol Security (IPSec) Protocol Security Associations (SAs) for a secure connection between an access system and an intermediate system and a secure connection between the intermediate system and a remote system, and binding the IPSec SAs to establish a secure connection between the access system and the remote system.

Establishing the secure connection between the access system and the remote system may include receiving a communication signal from the access system, and establishing the IPSec SA for the secure connection between the intermediate system and the remote system responsive to the communication signal. In one embodiment, the IPSec SA for the secure connection between the access system and the intermediate system is established after the IPSec SA for the secure connection between the intermediate system and the remote system has been established.

An identifier associated with the access system may be provided to the remote system for establishing the IPSec SA for the secure connection between the intermediate system and the remote system.

The operation of binding the IPSec SAs may include storing a respective Security Parameter Index (SPI) identifying each of the respective IPSec SAs in a memory.

During subsequent communications between the access system and the remote system, received communication signals from the remote system on the secure connection between the intermediate system and the remote system are preferably processed according to the IPSec SA for that secure connection to recover transmitted information from the communication signal. The recovered transmitted information may then be further processed according to the IPSec SA for the secure connection between the access system and the intermediate system to produce a communication signal for transmission to the access system.

In a similar manner, communication signals received from the access system on the secure connection between the access system and the intermediate system are preferably processed according to the IPSec SA for that secure connection to recover transmitted information, which may then be further processed according to the IPSec SA for the secure connection between the intermediate system and the remote system to produce a communication signal for transmission to the remote system.

In one embodiment, an IPSec SA for a new secure connection between the access system and the intermediate system is established responsive to detecting a change in operating conditions of the access system.

The operation of establishing the IPSec SA for the secure connection between the intermediate system and the remote system may include establishing respective IPSec SAs for a secure connection between the intermediate system and a second intermediate system and a secure connection between the second intermediate system and the remote system and binding the IPSec SAs for the secure connections between the intermediate system and the second intermediate system and between the second intermediate system and the remote system.

According to another aspect of the invention, there is also provided a system for establishing a secure connection between an access system and a remote system, including a transceiver for communicating with the access system and the remote system, and a processor. The processor is configured to establish respective IPSec SAs for secure connections with the access system and the remote system through the transceiver, and to bind the IPSec SAs to establish the secure connection between the access system and the remote system.

According to one embodiment of the invention, a communication system includes an access system, a remote system, and an intermediate system for establishing a secure connection between the access system and the remote system. In a further embodiment, a second intermediate system establishes a secure connection between the intermediate system and the remote system.

In another aspect, a computer-readable medium is provided and stores a data structure comprising an identifier of an IPSec SA for a secure connection between an intermediate system and an access system, and an identifier of an IPSec SA for a secure connection between the intermediate system and a remote system. The IPSec SAs are bound in the memory to thereby establish a secure connection between the access system and the remote system.

A still further aspect of the invention provides a method of managing a secure connection between an access system and a remote system, the secure connection comprising a secure connection between the access system and an intermediate system and a secure connection between the intermediate system and the remote system. The method involves detecting a change in operating conditions of the access system, and establishing a new secure connection between the access system and the intermediate system responsive to the detecting, whereby the secure connection between the access system and the remote system comprises the new secure connection between the access system and the intermediate system and the secure connection between the intermediate system and the remote system.

The change may be a change in an address of the access system, for example, such as an Internet Protocol (IP) address. Detection of the address changes may include receiving an address change notification or determining that a handoff of a connection from a first communication network to a second communication network is imminent. In some embodiments, an imminent handoff is determined by receiving a trigger for the handoff or determining a characteristic of a communication signal received from the access system on the secure connection between the access system and the intermediate system.

In order to establish a new secure connection, security parameters between the access system and the intermediate system may be renegotiated. According to an alternative embodiment, the secure connection between the access system and the intermediate system is first established by negotiating security parameters to be used between endpoint addresses, the endpoint addresses comprising an address of the intermediate system and an address of the access system, and the change in operating conditions comprises a change in the address of the access system to a new access system address. In this case, establishing a new secure connection may involve updating the endpoint address of the access system to the new access system address.

Where a second intermediate system is provided, the secure connection between the intermediate system and the remote system includes a secure connection between the intermediate system and the second intermediate system and a secure connection between the second intermediate system and the remote system. The method may then include the further operations of detecting a change in operating conditions of the remote system, and establishing a new secure connection between the second intermediate system and the remote system responsive to the detecting, whereby the secure connection between the intermediate system and the remote system comprises the secure connection between the intermediate system and the second intermediate system and the new secure connection between the second intermediate system and the remote system.

A related aspect of the invention provides an intermediate system for managing a secure connection between an access system and a remote system. The secure connection includes a secure connection between the access system and the intermediate system and a secure connection between the intermediate system and the remote system, and the intermediate system includes a transceiver for communicating with the access system and the remote system, and a processor. The processor is configured to detect a change in operating conditions of the access system, and to establish a new secure connection between the access system and the intermediate system through the transceiver responsive to a detected change in operating conditions of the access system, whereby the secure connection between the access system and the remote system comprises the new secure connection between the access system and the intermediate system and the secure connection between the intermediate system and the remote system.

There is also provided a method of managing a secure connection between a first system and a second system, the secure connection comprising a first secure connection between the first system and an intermediate system and a second secure connection between the intermediate system and the second system. The method may include detecting a change in operating conditions of the first system or the second system, establishing a new secure connection between the first system and the intermediate system responsive to detecting a change in the operating conditions of the first system, whereby the secure connection between the first system and the second system comprises the new secure connection between the first system and the intermediate system and the second secure connection, and establishing a new secure connection between the intermediate system and the second system responsive to detecting a change in the operating conditions of the second system, whereby the secure connection between the first system and the second system comprises the first secure connection and the new secure connection between the intermediate system and the second system.

Changes to different respective operating conditions for the first system and the second system may be detected.

Another aspect of the invention provides an intermediate system for managing a secure connection between a first system and a second system. The secure connection comprises a first secure connection between the first system and the intermediate system and a second secure connection between the intermediate system and the second system, and the intermediate system includes a transceiver for communicating with the first system and the second system, and a processor configured to detect a change in operating conditions of the first system or the second system. The processor is further configured to establish a new secure connection between the first system and the intermediate system responsive to detecting a change in the operating conditions of the first system, whereby the secure connection between the first system and the second system comprises the new secure connection between the first system and the intermediate system and the second secure connection, and to establish a new secure connection between the intermediate system and the second system responsive to detecting a change in the operating conditions of the second system, whereby the secure connection between the first system and the second system comprises the first secure connection and the new secure connection between the intermediate system and the second system.

In a still further aspect, there is provided a method of managing a secure connection between a first system and a second system, the secure connection comprising a first secure connection between the first system and a first intermediate system, a second secure connection between the first intermediate system and a second intermediate system, and a third secure connection between the second intermediate system and the second system. The method includes operations of detecting a change in operating conditions of the first system or the second system, establishing a new secure connection between the first system and the first intermediate system responsive to detecting a change in the operating conditions of the first system, whereby the secure connection between the first system and the second system comprises the new secure connection between the first system and the first intermediate system, the second secure connection, and the third secure connection, and establishing a new secure connection between the second intermediate system and the second system responsive to detecting a change in the operating conditions of the second system, whereby the secure connection between the first system and the second system comprises the first secure connection, the second secure connection, and the new secure connection between the second intermediate system and the second system.

A communication system having first and second intermediate systems for managing a secure connection between a first system and a second system is also provided in another aspect of the invention. The secure connection includes a first secure connection between the first system and the first intermediate system, a second secure connection between the first intermediate system and the second intermediate system, and a third secure connection between the second intermediate system and the second system. The first and second intermediate systems include respective transceivers and processors. In the first intermediate system, the transceiver communicates with the first system and the second intermediate system, and the processor is configured to detect a change in operating conditions of the first system, and to establish a new secure connection between the first system and the first intermediate system responsive to detecting a change in the operating conditions of the first system, whereby the secure connection between the first system and the second system comprises the new secure connection between the first system and the first intermediate system, the second secure connection, and the third secure connection. In the second intermediate system, the transceiver communicates with the first intermediate system and the second system, and the processor is configured to detect a change in operating conditions of the second system, and to establish a new secure connection between the second intermediate system and the second system responsive to detecting a change in the operating conditions of the second system, whereby the secure connection between the first system and the second system comprises the first secure connection, the second secure connection, and the new secure connection between the second intermediate system and the second system.

Other aspects and features of embodiments of the present invention will become apparent to those ordinarily skilled in the art upon review of the following description of specific embodiments of the invention.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Providing real-time services over mobile communication systems tends to be particularly challenging in view of their scarce bandwidth, changing network addresses for mobile communication devices, lower computing power of mobile communication devices, and generally higher error rates relative to wired communication systems. Latencies in signaling for location updates and delivery of user traffic may present further difficulties. Location update and data delivery latencies during and after a handoff can cause substantial losses to data transmitted by or from a mobile communication device. Efficient mechanisms have to be developed to reduce the latencies and thereby improve the overall throughput in order to support real time services including Voice over IP (VoIP) and multimedia content, for example, which are quickly growing markets and have generated great interest in recent years.

Traditional approaches to establishing and maintaining secure VPN services and other secure communication connections are not designed well for mobile users. Every time a network layer handoff is performed, due to mobile communication device roaming, IPSec SAs, which are often used to provide secure VPN connections, must be re-negotiated. This can lead to packet loss, additional latency, and undue loading on a host system or security gateway (SG) with which IPSec SAs are established. To alleviate these problems, embodiments of the invention provide an intermediate system, referred to as an anchored proxy security gateway (APSG) in the example communication system described below with reference to FIG. 5, which acts as an intermediary between an access system and a host system or an SG.

According to one embodiment, the intermediate system maintains a binding between IPSec SAs established between it and a remote system, which may be a host system or a system including or associated with an SG, and IPSec SAs established between itself and an access system. Therefore, security negotiations due to handoffs are performed at the intermediate system instead of the remote system, which reduces the loading on the remote system and signalling latency because of the closer proximity of the intermediate system to the access system. Additionally, data may be buffered at the intermediate system during handoffs, and optionally before the detection of an imminent handoff, to further reduce data loss.

Figure 1:
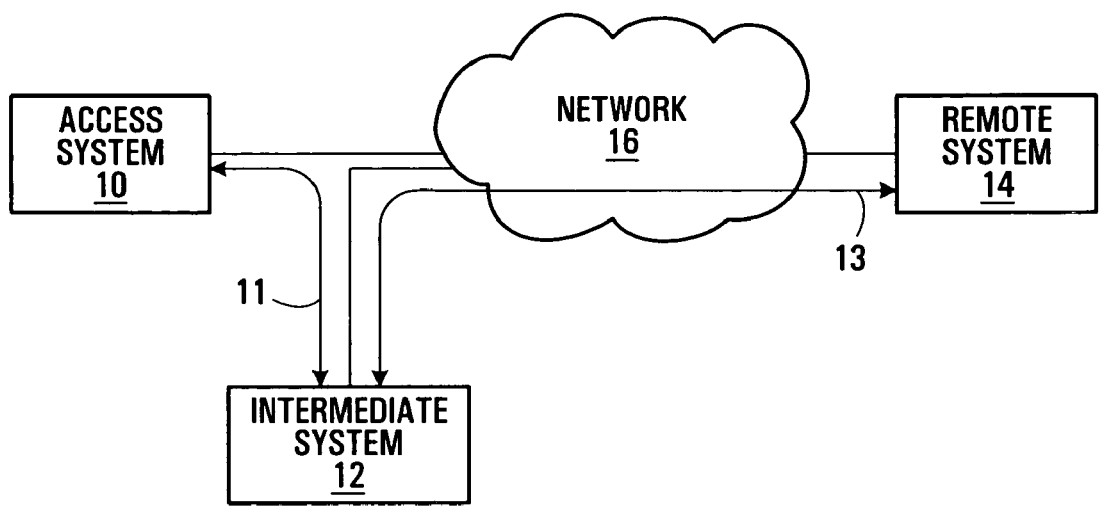
FIG. 1 is a block diagram of a communication system in which embodiments of the invention may be implemented.

FIG. 1 is a block diagram of a communication system in which embodiments of the invention may be implemented. The communication system in FIG. 1 includes an access system 10, an intermediate system 12, and a remote system 14 connected to a communication network 16. Although many access systems 10, intermediate systems 12, and remote systems 14 may be connected to the communication network 12, only one example of each type of system has been shown in FIG. 1 to avoid congestion. It should therefore be appreciated that the system of FIG. 1, as well as the contents of the other drawings, are intended solely for illustrative purposes, and that the present invention is in no way limited to the particular example embodiments explicitly shown in the drawings and described herein.

The access system 10, the intermediate system 12, and the remote system 14 are or at least include communication devices between which connections may be established through the communication network 16. In one embodiment, the access system 10 is a wireless mobile communication device and the remote system 14 is a corporate network which includes a gateway through which resources of the corporate network are remotely accessible. As described in further detail below, the intermediate system 12 provides a further gateway through which the access system 10 may achieve access to the remote system 14. It should be appreciated that the access system 10 is not necessarily restricted to accessing the remote system 14 only through the intermediate system 12. Alternate access mechanisms may also be provided. For example, a user of the access system 10 may opt to establish communications directly with the remote system 14 instead of using the intermediate system 12.

The network 16, although shown as a single component in FIG. 1, may include more than one type of communication network. For example, where the access system 10 is adapted to operate within a mobile communication network and the remote system 14 is accessible through the Internet, the network 16 represents both a mobile communication network and a wired communication network. In this case, the intermediate system 12 is preferably connected to both the mobile communication network and the wired communication network. Embodiments of the invention may also be implemented in conjunction with other types of networks and interconnections.

Thus, a connection may be virtually any type of connection over which communication signals are exchanged. As those skilled in the art will appreciate, connections may include wired connections, wireless connections, or some combination thereof. The particular types of communication connections available between the access system 10, the intermediate system 12, and the remote system 14 may be dependent upon the type of the communication network 16 and the protocols used therein, the services offered by service providers using the communication network 16, the type of end user equipment at the access system 10, the intermediate system 12, and the remote system 14, and possibly other factors.

In a conventional secure communication scheme, a secure VPN connection using IPSec between the access system 10 and the remote system 14 is established using an address of the access system 10 as an endpoint. However, in the event of a change of address of the access system 10, IPSec SAs must be re-negotiated between the access system 10 and the remote system 14, which consumes resources of the remote system 14. Latency inherent in the communication network 16 also causes delays in the re-negotiation process, which in turn may result in data loss and service interruption.

It may therefore be desirable to reduce resource demands at the remote system 14 for secure connection re-negotiation and the latency involved in the IPSec SA negotiation process.

Embodiments of the present invention effectively split end-to-end connections into two connections, including the connection 11 between the access system 10 and the intermediate system 12, and the connection 13 between the intermediate system 12 and the remote system 14. For an IPSec-based secure connection, the IPSec negotiation process is thus divided into two IPSec components. The first component is between the access system 10 and the intermediate system 12, and the second component is between the intermediate system 12 and the remote system 14. When an address of the access system 10 changes, then IPSec re-negotiation is performed only for the connection between the access system 10 and the intermediate system 12. The intermediate system 12 is preferably positioned at a physical location which is closer to the access system 10 than the remote system 14, to thereby reduce latency associated with IPSec re-negotiation since messages involved in the re-negotiation process do not have to travel as far, i.e., only to the intermediate system 12 and not all the way to the remote system 14. Re-negotiation processing when an address of the access system 10 changes is also thereby off-loaded from the remote system 14 to the intermediate system 12.

Figure 2:
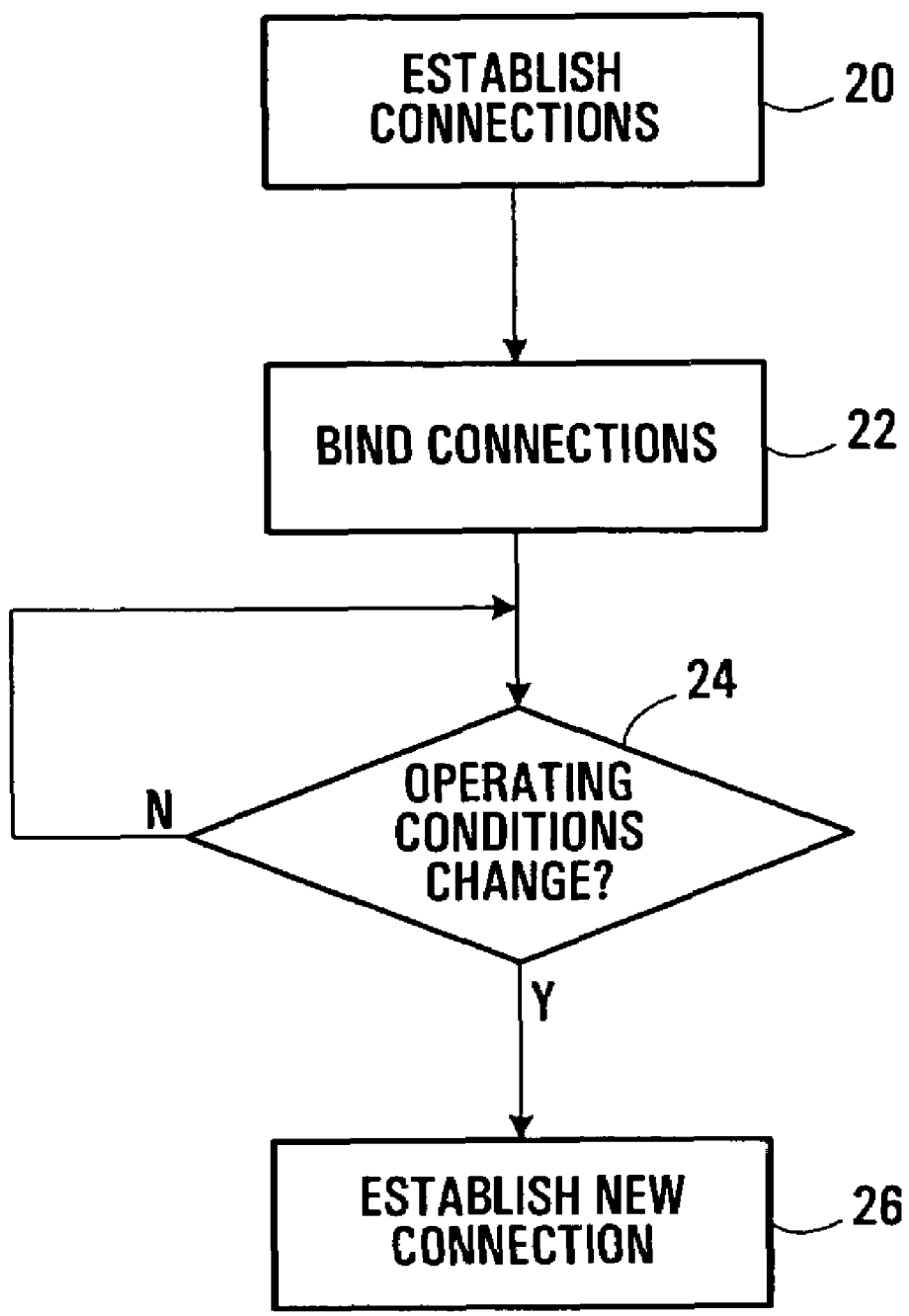
FIG. 2 is a flow diagram of a method according to an embodiment of the invention.

FIG. 2 is a flow diagram of a method according to an embodiment of the invention. The communication method of FIG. 2 includes establishing secure connections between an access system and an intermediate system and between the intermediate system and a remote system at 20 and binding the connections at 22 to establish a secure connection between the access system and the remote system. Examples of an access system, intermediate system, and remote system are shown at 10, 12, 14 in FIG. 1 and described above.

In one embodiment, the operations at 20 include establishing respective IPSec SAs for the secure connection between the access system and the intermediate system and the secure connection between the intermediate system and the remote system. The SAs are then bound at 22 to establish the secure end-to-end connection between the access system and the remote system. As those skilled in the art will appreciate, an SA typically provides data security for data transfers in one direction between communicating parties. Therefore, it should be understood that references herein to establishing an SA for a secure connection are intended to include establishing either a single SA or multiple SAs, for unidirectional or bidirectional secure communications, respectively.

Connection establishment at 20 may be initiated by the access system, for example, by transmitting a communication signal to the intermediate system. Where IPSec is used to provide the secure connections, the communication signal from the access system thereby starts the IKE process towards the remote system via the intermediate system. The address of the intermediate system may be provided to the access system at some time before remote access is attempted, for instance when remote access services are provisioned for the access system, advertised by location-based services in a mobile communication network if the access system is a mobile communication device, for example, or provided by the remote system when the access system performs or attempts the IKE process directly with the remote system. Other intermediate system address distribution schemes may also be apparent to those skilled in the art.

According to one embodiment of the invention, the intermediate system first establishes the IPSec SA for the secure connection between the intermediate system and the remote system responsive to a communication signal from the access system. The IPSec SA for the secure connection between the access system and the intermediate system is then established after the IPSec SA for the secure connection between the intermediate system and the remote system has been established.

If the purpose of the secure connection is for the access system to gain access to resources at the remote system, as in the case of a secure VPN connection to the remote system, then it may be preferable to establish the access system to intermediate system connection only if the intermediate system to remote system connection is successfully established. However, the invention is in no way restricted to any particular order of connection establishment. For example, the intermediate system may perform operations to establish a connection with the access system before the connection to the remote system has been established.

When establishing the IPSec SA for the secure connection between the intermediate system and the remote system, the intermediate system may use an identifier and other credentials of the access system, but with an address of the intermediate system as an endpoint. In this manner, the intermediate system may initiate the IKE process towards the remote system effectively mimicking as the access system. Once the SA for the intermediate system to remote system connection is negotiated, the SA negotiation process is preferably initiated between the intermediate system and the access system, with the intermediate system and the access system using their own respective credentials.

Figure 3:
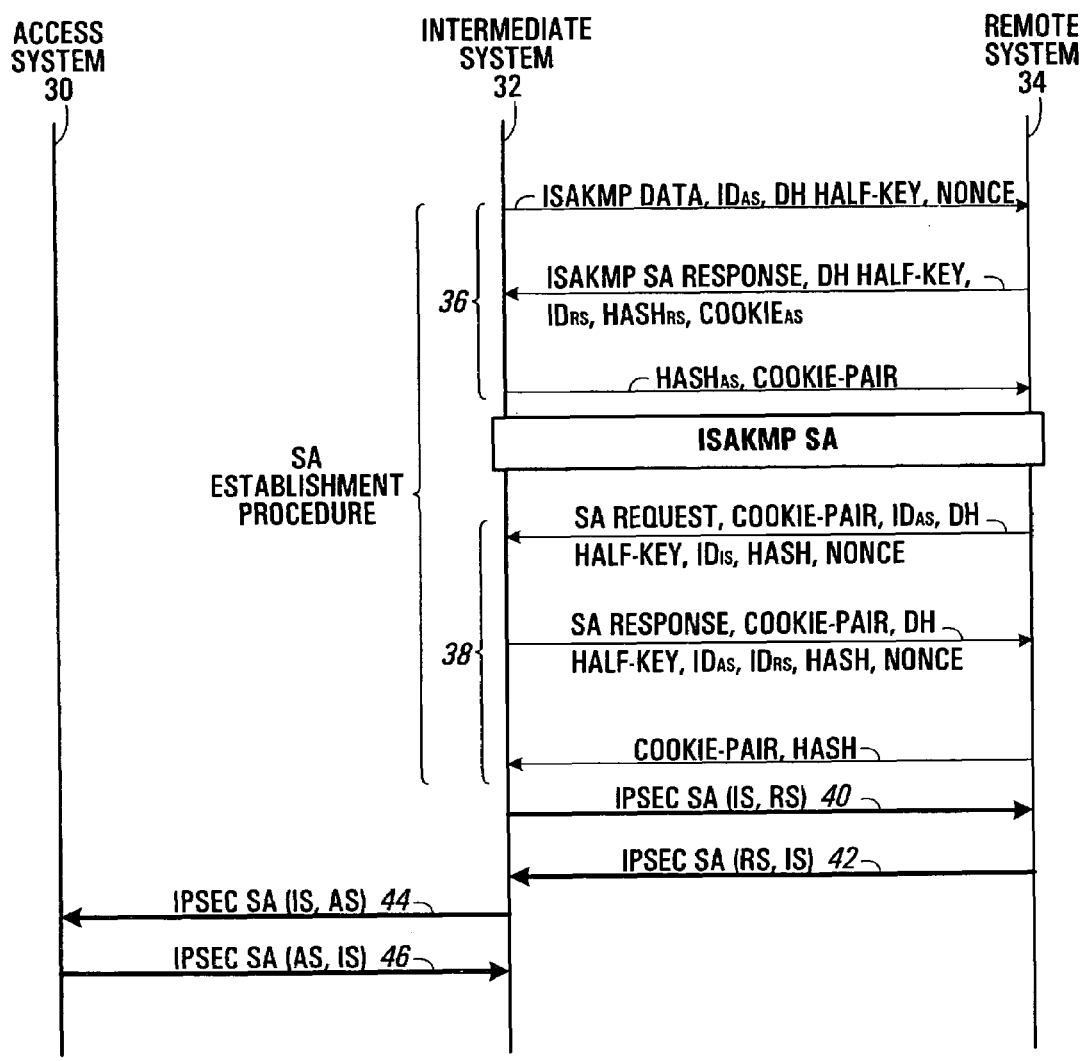
FIG. 3 is a message flow diagram illustrating secure connection establishment according to an embodiment of the invention.

FIG. 3 is a message flow diagram illustrating secure connection establishment according to an embodiment of the invention. An access system, intermediate system, and remote system are shown at 30, 32, 34, respectively. As those skilled in the art will be familiar with IPSec SA processes, the message flow of FIG. 3 is described only briefly below.

Signalling during an ISAKMP SA establishment phase is illustrated at 36. The intermediate system transfers ISAKMP data, an identifier of the access system 30, denoted $ID_{AS}$, a Diffie-Hellman half-key and a nonce to the remote system 34. The remote system 34 responds with an ISAKMP SA response, a Diffie-Hellman half-key, an identifier of the remote system, denoted $ID_{RS}$, a hash $Hash_{RS}$, and a cookie $Cookie_{AS}$. The ISAKMP SA phase signalling is completed with the transfer of a hash $Hash_{AS}$ and a cookie pair Cookie-pair from the intermediate system 32 to the remote system 34. The ISAKMP SA is successfully established when the intermediate system 32 and the remote system 34 verify the hashes $Hash_{RS}$ and $Hash_{AS}$ and each other's identities. The message flow at 36 differs from conventional ISAKMP message flows in that the intermediate system 32 uses credentials of the access system 30 instead of its own credentials.

Signalling for phase two of IPSec SA establishment is illustrated at 38, and proceeds in a substantially similar manner to the ISAKMP SA signalling at 36, with information being exchanged between the intermediate system 32 and the remote system 34 to establish an IPSec SA [IS, RS] 40, an ESP SA, for example, for data transfers from the intermediate system 32 to the remote system 34. As will be apparent, 42 designates an IPSec SA [RS, IS] for data transfers in the other direction.

IPSec SAs are established for a secure connection between the intermediate system 32 and the access system 30 in a similar manner at 44 and 46, with the intermediate system 32 and the access system 30 using their own respective credentials.

Although FIG. 3 illustrates a particular example of IPSec SA establishment, it should be appreciated that the invention is in no way limited thereto. For example, embodiments of the invention may be implemented in conjunction with secure connections which provide unidirectional data security instead of the bidirectional security provided by the SAs shown in FIG. 3.

Referring again to FIG. 2, one possible mechanism for binding the secure connections between the access system and the intermediate system and between the intermediate system and the remote system at 22 is to store an identifier of the connections in a memory, in a lookup table, for example. As an IPSec SA is typically identified using an SPI, the intermediate system may store respective SPIs identifying the IPSec SAs for the secure connections.

In one embodiment, the intermediate system creates an entry or record in a lookup table with an identifier of the access system and possibly an identifier of the remote system with which a connection is to be established for the access system. System identifiers may include, for example, an IP address and a MAC address, if it is possible to obtain the MAC address. Secure connection identifiers, illustratively SPIs associated with IPSec SAs, are preferably stored in the same entry. Other identifiers and addresses may also or instead be used in a lookup table entry or other type of record for binding secure connections.

A table entry may be created when a communication signal requesting a connection to the remote system is received from an access system or after one or both of the secure connections with the remote system and the access system have been established, for example. Thus, SPIs may be added to data fields in a previously created table entry or populated when the entry is created.

After the secure connections have been established and bound, communication signals received from the remote system are processed by the intermediate system according to the IPSec SA for the secure connection between the remote system and the intermediate system, illustratively IPSec SA [RS, IS] in FIG. 3, to recover transmitted information. Communication signal processing may include, for example, decryption and digital signature checking. The recovered transmitted information is then further processed according to the IPSec SA for the secure connection between the access system and the intermediate system, IPSec SA [IS, AS] in FIG. 3 for instance, to produce a communication signal for transmission to the access system. This further processing may include such operations as encryption and digital signing.

Similarly, communication signals containing transmitted information from the access system and destined for the remote system are processed by the intermediate system according to the IPSec SA for the secure connection between the access system and the intermediate system, IPSec SA [AS, IS] of FIG. 3 for example, to recover the transmitted access system information. The recovered access system information is further processed according to the IPSec SA for the secure connection between the intermediate system and the remote system, illustratively IPSec SA [IS, RS] of FIG. 3, to produce a communication signal for transmission to the remote system.

An intermediate system thereby recovers information which is transmitted by the access system and the remote system. Appropriate security measures are thus preferably implemented at the intermediate system to prevent any unauthorized access to the recovered information during transfer between the access system and the remote system.

In accordance with a further aspect of the invention, the method of FIG. 2 includes detecting a change in operating conditions of the access system at 24 and establishing a new connection with the access system at 26 responsive to a detected change. The secure end-to-end connection between the access system and the remote system thereafter includes the new secure connection between the access system and the intermediate system and the previous existing secure connection between the intermediate system and the remote system.

The detection at 24 may involve detecting a change in an address of the access system, an IP address for instance. As described above, access system address changes may occur relatively often when the access system is or includes a mobile communication device and communications are handed off between adjacent communication networks or subnets which use different sets of addresses.

An access system may be configured to update an intermediate system by transmitting an address change notification. The intermediate system may also or instead detect an address change by monitoring a "from" address or analogous information in communication signals received from the access system. In a further embodiment, the intermediate system determines that an access system address change is imminent. This type of determination may be made for mobile communication devices, for example, based on an imminent handoff trigger generated by a lower layer protocol using measured signal power, signal-to-noise ratio, error rate, or other characteristic of a communication signal received from the access system.

Following a handoff or other access system address change, the secure connection binding, a table maintained at the intermediate system in an embodiment described above, is updated to reflect the new access system address. Any communication signals, illustratively packets, destined for the access system and buffered or in transit between the remote system and the intermediate system can then be forwarded to the new address, for example by using the IPSec SA which was created using the previous access system address and tunnelling signals to the new address. Where an imminent address change is detected, the intermediate system may begin buffering signals for later transmission to the access system when the new access system address is available.

The operations at 26 may include, for example, establishing a new IPSec SA for a new secure connection between the access system and the intermediate system through IKE negotiations using the new IP address of the access system. Once the new SA is created, the new SA is bound to the SA for the existing secure connection between the intermediate system and the remote system, by updating a table stored in memory at the intermediate system for instance. This re-negotiation may also be started when an imminent handoff is detected.

It should be appreciated that the operations at 26 may include a complete IPSec SA establishment process, a partial SA re-negotiation process, or possibly a reassignment of an existing IPSec SA to a new connection between the intermediate system and the access system.

Figure 4:
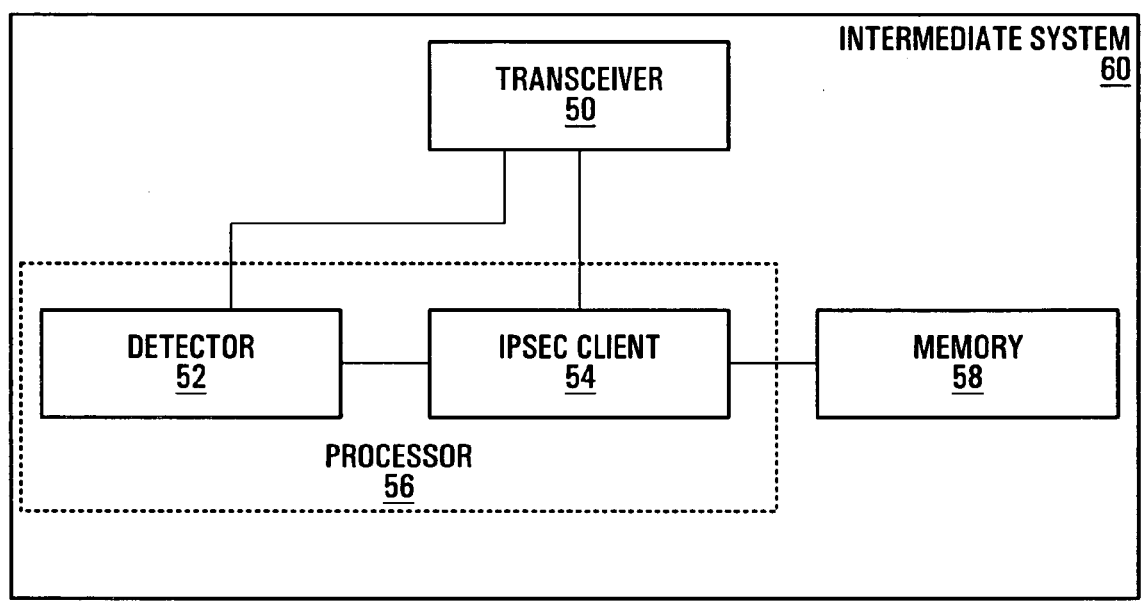
FIG. 4 is a block diagram of an intermediate system in accordance with an embodiment of the invention.

The preceding description relates primarily to methods according to embodiments of the invention. FIG. 4 is a block diagram of an intermediate system in accordance with an embodiment of the invention. The example intermediate system 60 includes an IPSec client 54, connected to a memory 58, a transceiver 50, and a detector 52 which is also connected to the transceiver 50.

The transceiver 50 may be a modem, for example, through which communications with an access system and a remote system may be established. The particular structure and operation of the transceiver 50 is dependent upon the type or types of communications it supports. It is also contemplated that the transceiver 50 may include more than one type of transceiver, for respective communications with an access system and a remote system configured for operation with different types of communication networks, media, or protocols.

The memory 58 may similarly include one or more memory devices, which may be of the same or different types. In a preferred embodiment, the memory 58 is a solid state memory device such as a random access memory (RAM), although other types of memory device may also or instead be provided.

Secure connection establishment and communication signal processing is handled by the IPSec client 54, which may be implemented in a processor 56, as shown, or more particularly in software which the processor 56 is configured to execute. The IPSec client 54 operates in conjunction with other IPSec clients at an access system and a remote system to establish secure connections and process communication signals received or to be transmitted over those connections.

The processor 56 may be a dedicated processor or a general purpose processor which also executes other software such as operating system software or software applications, and possibly performs other functions or operations of the intermediate system. In the embodiment shown in FIG. 4, for example, the processor 56 also provides a detector 52.

The detector 52 includes one or more modules or components for detecting changes in access system operating conditions. As described above, an intermediate system may detect changes in such access system operating conditions as access system address and received signal strength, for example. Thus, the detector 52 may include a module for receiving address change notifications from an access system or for parsing or receiving a sender address or analogous information in communication signals received from the access system to thereby detect an access system address change. Signal strengths may be determined in a digital signal processor (DSP), for example. Thus, the detector 52 may include or operate in conjunction with multiple types of detector.

The invention is in no way limited to the example embodiment of FIG. 4, in which the processor 56 executes software to provide both secure connection establishment and detection functions. In other embodiments, an intermediate system may include separate hardware components supporting these functions. References herein to functions performed by a processor, detector, and IPSec client should thus be interpreted accordingly.

Operation of the intermediate system 60 will be apparent from the above method description. Respective IPSec SAs for secure connections with an access system and a remote system are established by the IPSec client 54 through the transceiver 50, and bound to each other to establish a secure connection between the access system and the remote system. The SAs may be bound by storing SPIs or other identifiers of each of the SAs in the memory 58. When the SAs have been bound, communication signals including information to be transferred between the access system and the remote system are processed substantially as described above.

Secure connection re-establishment operations at an intermediate system have also been described above. In response to a change in operating conditions of the access system detected by the detector 52, a new secure connection between the access system and the intermediate system is established by the IPSec client 54 through the transceiver 50. The secure connection between the access system and the remote system thereafter includes the new secure connection between the access system and the intermediate system and the existing secure connection between the intermediate system and the remote system.

Although not explicitly shown in the drawings, it should be appreciated that an access system and a remote system may be substantially similar to the intermediate system 60, in that each includes some sort of transceiver and IPSec client for establishing secure connections with the intermediate system. At an access system, these components are expected to be implemented in a single electronic device, illustratively a mobile communication device. As those skilled in the art will appreciate, however, separate interconnected computer systems are often used to provide remote access functions and other resources. For example, in one common arrangement, a security gateway within a corporate network provides remote access functions for all network resources.

Figure 5:
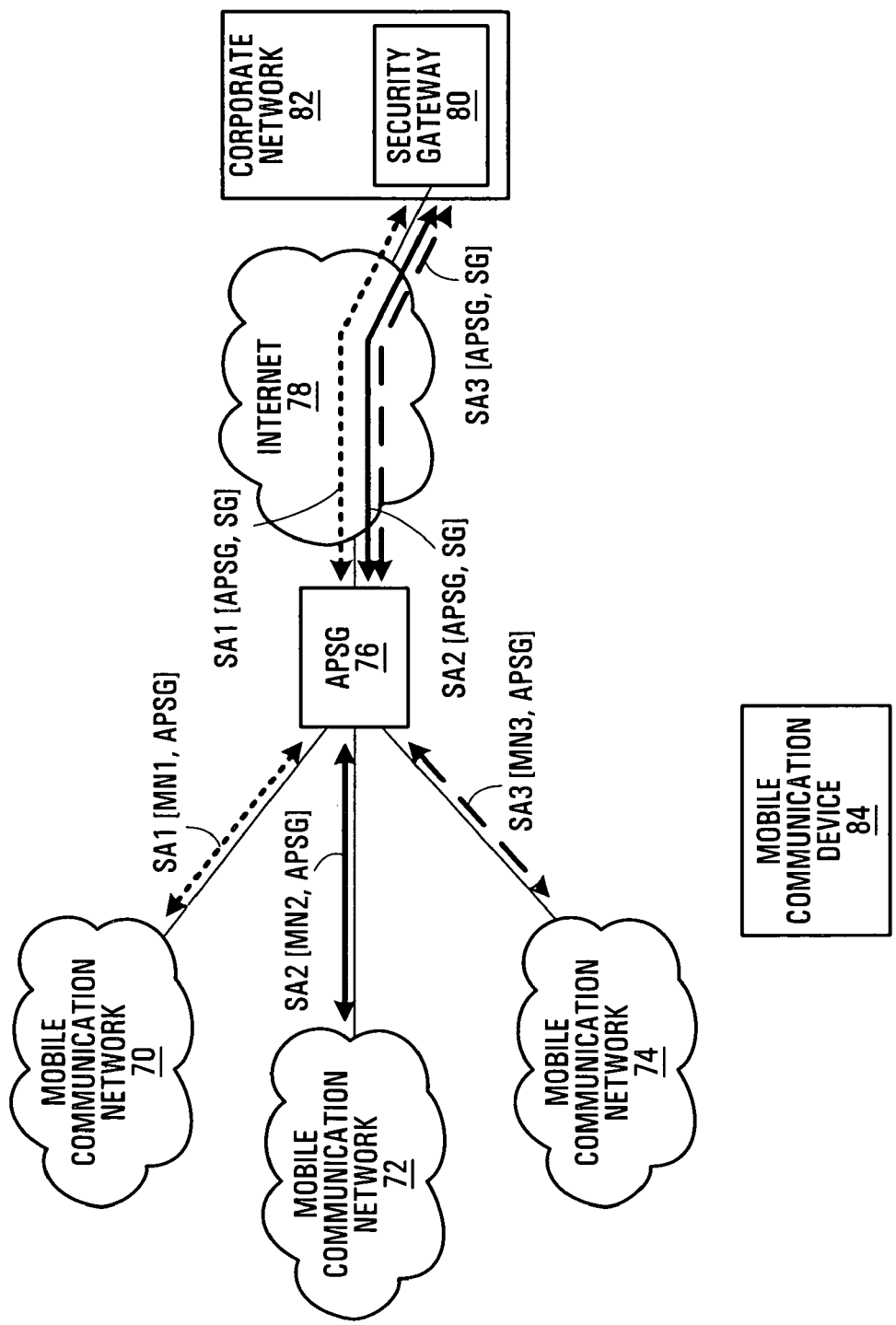
FIG. 5 is a block diagram of a communication system incorporating a further embodiment of the invention.

FIG. 5 is a block diagram of a communication system incorporating a further embodiment of the invention. The communication system of FIG. 5 includes a corporate network 82, an anchored proxy security gateway (APSG) 76 which may establish secure connections with the corporate network 82 through the Internet 78 and a security gateway (SG) 80, and a plurality of mobile communication networks 70, 72, 74 within which mobile communication devices, one of which is shown at 84, are configured to operate.

In the system of FIG. 5, the mobile communication device 84 represents an access system, the APSG 76 represents an intermediate system, and the corporate network 82 represents a remote system. The corporate network 82 also provides an example of a remote system in which remote system resources and remote access thereto are supported by separate components, in that the SG 80 provides remote access to resources of the corporate network 82.

The mobile communication networks 70, 72, 74 are intended to represent different network address spaces. Although shown separately in FIG. 5 for illustrative purposes, the networks 70, 72, 74 may be parts of the same communication network. The mobile communication device 84 is thus assigned a different address when operating within the networks 70, 72, 74.

A secure connection may be established between the mobile communication device 84 and the corporate network 82 by the APSG 76 when the mobile communication device is operating in any of the networks 70, 72, 74. If a user of the mobile communication device 84 wishes to communicate securely with the corporate network 82, to access IP Services stored at the corporate network 82 for example, while the device 84 is operating within the network 70, then an IKE process towards the SG 80 via the APSG 76 is started.

Connection establishment may then proceed substantially as described above. In one embodiment, the APSG 76 uses the credentials of the mobile communication device 84 and its own address as an endpoint to initiate the IKE process towards the SG 80 mimicking as the mobile communication device 84. Once SA1[APSG, SG] has been negotiated, the APSG 76 initiates the same process with the mobile communication device 84, which is operating in the network 70 in this example, using its own credentials and requests the mobile communication device 84 to perform the same if bidirectional security is to be established. The APSG 76 then binds the SA created towards the mobile communication device 84, labelled SA1[MN1, APSG] in FIG. 5, and SA1 [APSG, SG]. A similar process may be used to establish secure connections between the mobile communication device 84 and the corporate network 82 when a secure connection is initiated while the device is operating within the other networks 72, 74.

The table below provides an illustrative example of a lookup table located at the APSG 76, in which SAs for secure connections between each of two mobile communication devices and the corporate network 82 are bound according to one embodiment of the invention. Although only one mobile communication device 84 is shown in FIG. 5, those skilled in the art will appreciate that the APSG 76 may be configured for operation with multiple mobile communication devices.

| Mobile ID | Mobile Address (Temporary) | Mobile Address (Fixed/SG allocated) | SPI to Mobile | SPI to SG |
|---|---|---|---|---|
| MN2@xyz.com | 128.25.15.56 | 216.24.15.4 | SPI[MN1, APSG] | SPI_1 [APSG, SG] |
| MN2@xyz.com | 216.148.15.50 | 216.24.15.93 | SPI[MN2, APSG] | SPI_2 [ASPG, SG] |

The above lookup table binds or associates secure connections using SPIs, which identify IPSec SAs. A data structure in a memory at an intermediate system may thereby include an SPI of an IPSec SA for a secure connection between an intermediate system and an access system and an SPI of an IPSec SA for a secure connection between the intermediate system and a remote system. For example, SPI[MN1, APSG] and SPI_1[APSG,SG] in the table identify SA1[MN1, APSG] and SA1[APSG,SG] in FIG. 5. The IPSec SAs are bound in the memory to thereby establish secure connections between mobile communication devices and the corporate network 82.

This example lookup table also includes identifiers of mobile communication devices, preferably home identifiers which do not change when the mobile communication devices roam, and current IP addresses of the mobile communication devices. When a handoff occurs, the APSG detects the new address of a mobile communication device and updates the lookup table accordingly. If a new SA is also established using the new IP address, then the table is similarly updated with a new SPI.

As described above, an SA provides security for data transfer in one direction. Thus, multiple records may be stored in a lookup table for a bidirectional secure connection to bind SAs for each data transfer direction. In another embodiment, a single record in a lookup table binds SAs created for both directions. In this case, each table entry may include four SPIs instead of two. Where an identifier may be used to identify more than one set of parameters for a secure connection or the same parameters are used for bidirectional security, then bidirectional secure connection binding may be accomplished with a single record having a general structure as shown in the above lookup table.

According to another aspect of the invention, the use of communication system resources is optimized by multiplexing secure connections, achieved in IPSec by so-called tunnelling, between the APSG 76 and the SG 80. For example, several tunnels may be established, with each tunnel being differentiated by a "class of service", and access to the tunnels being controlled on the basis of a service plan or privilege that a mobile communication device has.

An access system may also establish multiple secure connections to a remote system which share the same secure connection between the access system and an intermediate system. Where secure VPN connections to multiple remote systems are desired, the intermediate system to remote system connections may be established substantially simultaneously and bound to a single access system to intermediate system connection which is maintained when an address of the access system changes. This mechanism may be useful, for example, if a person is the owner of multiple business and would like to have independence between the connections to each business.

In this case, the access system may have one IPsec connection with an intermediate system, illustratively [MN1<->APSG] in the notation used above with reference to FIG. 5, and multiple IPsec connections [APSG<->SG1], [APSG<->SG2], etc. The access system now has to maintain only one IPsec connection with multiple virtual connections. The access system does not have to re-negotiate each SA for different corporations in the event of a handoff or other condition which may result in an address change.

For shared connection embodiments, some agreement on the level of security (compatibility) for accessing different services in different remote systems may be preferred. In one embodiment, the highest level of security among all intermediate system to remote system connections which share a single access system to intermediate system connection is adopted for the access system to intermediate system connection. For example, if AES is used between an APSG and a first security gateway SG1 and DES is used between the APSG and a second security gateway SG2, then AES may then be selected for a shared access system connection to the APSG. Other security level selection mechanisms are also possible.

It should be appreciated that remote systems need not necessarily be corporate systems or security gateways. IPsec gateways may also be implemented for home computer systems or networks for instance. Thus, multiple simultaneous connections may include a secure connection to a user's home system and a secure connection to a user's office system which share the same access system to intermediate system connection, for example. When the access system moves and changes its identity, only the connection between the access system and the intermediate system would be re-negotiated or updated.

What has been described is merely illustrative of the application of principles of the invention. Other arrangements and methods can be implemented by those skilled in the art without departing from the scope of the present invention.

Thus, more generally, a secure connection between a first system and a second system including a first secure connection between the first system and an intermediate system and a second secure connection between the intermediate system and the second system may be managed according to the techniques described above. In response to detecting a change in operating conditions of the first system or the second system, a new secure connection between the intermediate system and one of the first and second systems may be established while the other secure connection is maintained.

It is also contemplated that a secure connection may include respective secure connections between multiple intermediate systems. For example, a secure connection between a first system and a second system may be established through a first intermediate system, preferably in the vicinity of the first system, and a second intermediate system, preferably in the vicinity of the second system. In this case, each of the first and second systems has a secure connection to the first or second intermediate system which is re-negotiated or updated as described above when a new address is assigned, for example. A connection between the first and second intermediate systems may thus remain intact even when operating conditions of either or both of the first and second systems change. In the context of an access system and a remote system, a secure connection between an intermediate system and a remote system may include a secure connection between the intermediate system and a second intermediate system and a secure connection between the second intermediate system and the remote system, with the secure connection between the second intermediate system and the remote system being managed substantially as described above.

Embodiments of the invention may also be implemented with security protocols and techniques other than IPSec.

In addition, although described primarily in the context of methods and systems, other implementations of the invention are also contemplated, as instructions stored on a computer-readable medium for example.

We claim:

1. A method of managing a secure connection between an access system and a remote system, the secure connection comprising a secure connection between the access system and an intermediate system and a secure connection between the intermediate system and the remote system, the method comprising:
    establishing the secure connection between the intermediate system and the remote system using credentials of the access system for the intermediate system;
    establishing the secure connection between the access system and the intermediate system only after the secure connection between the intermediate system and the remote system has been established;
    detecting a change in operating conditions of the access system; and
    establishing a new secure connection between the access system and the intermediate system responsive to the detecting, whereby the secure connection between the access system and the remote system comprises the new secure connection between the access system and the intermediate system and the secure connection between the intermediate system and the remote system.

2. The method of claim 1, wherein establishing a new secure connection comprises negotiating security parameters between the access system and the intermediate system.

3. The method of claim 1, wherein the secure connection between the access system and the intermediate system is established by negotiating security parameters to be used between endpoint addresses, the endpoint addresses comprising an address of the intermediate system and an address of the access system, wherein the change in operating conditions comprises a change in the address of the access system to a new access system address, and wherein establishing a new secure connection comprises updating the endpoint address of the access system to the new access system address.

4. The method of claim 1, wherein the secure connection between the access system and the intermediate system and the secure connection between the intermediate system and the remote system have respective Internet Protocol Security (IPSec) Protocol Security Associations (SAs).

5. The method of claim 1, wherein the secure connection between the intermediate system and the remote system comprises a secure connection between the intermediate system and a second intermediate system and a secure connection between the second intermediate system and the remote system, the method further comprising:
  detecting a change in operating conditions of the remote system; and
  establishing a new secure connection between the second intermediate system and the remote system responsive to the detecting, whereby the secure connection between the intermediate system and the remote system comprises the secure connection between the intermediate system and the second intermediate system and the new secure connection between the second intermediate system and the remote system.

6. The method of claim 1, wherein the secure connection between the access system and the remote system comprises one of a plurality of secure connections between the access system and at least one remote system including the remote system, the plurality of secure connections comprising the secure connection between the access system and the intermediate system and respective secure connections between the intermediate system and the at least one remote system.

7. A computer-readable medium storing instructions which when executed perform the method of claim 1.

8. The method of claim 1, wherein detecting comprises detecting a change in an address of the access system.

9. The method of claim 8, wherein the address of the access system comprises an Internet Protocol (IP) address.

10. The method of claim 8, wherein detecting a change in an address of the access system comprises receiving an address change notification.

11. The method of claim 1, wherein the secure connection between the access system and the intermediate system comprises a connection through a first communication network, and wherein detecting comprises determining that a handoff of the connection from the first communication network to a second communication network is imminent.

12. The method of claim 11, wherein determining that a handoff is imminent comprises at least one of: receiving a trigger for the handoff and determining a characteristic of a communication signal received from the access system on the secure connection between the access system and the intermediate system.

13. An intermediate system for managing a secure connection between an access system and a remote system, the secure connection comprising a secure connection between the access system and the intermediate system and a secure connection between the intermediate system and the remote system, the intermediate system comprising:
  a transceiver for communicating with the access system and the remote system; and
  a processor configured to establish the secure connection between the intermediate system and the remote system using credentials of the access system for the intermediate system, to establish the secure connection between the access system and the intermediate system only after the secure connection between the intermediate system and the remote system has been established, to detect a change in operating conditions of the access system, and to establish a new secure connection between the access system and the intermediate system through the transceiver responsive to a detected change in operating conditions of the access system, whereby the secure connection between the access system and the remote system comprises the new secure connection between the access system and the intermediate system and the secure connection between the intermediate system and the remote system.

14. The system of claim 13, wherein the processor is configured to establish a new secure connection by negotiating security parameters for the new secure connection with the access system.

15. The system of claim 13, wherein the secure connection between the access system and the intermediate system and the secure connection between the intermediate system and the remote system have respective Internet Protocol Security (IPSec) Protocol Security Associations (SAs), and wherein the processor comprises an IPSec client for establishing the new secure connection with an IPSec client of the access system.

16. The system of claim 13, wherein the secure connection between the access system and the remote system comprises one of a plurality of secure connections between the access system and at least one remote system including the remote system, the plurality of secure connections comprising the secure connection between the access system and the intermediate system and respective secure connections between the intermediate system and the at least one remote system.

17. A communication system comprising:
  an access system;
  a remote system;
  an intermediate system comprising the system of claim 13 for establishing a secure connection between the access system and the remote system by establishing respective secure connections between the access system and the intermediate system and between the intermediate system and the remote system; and
  a second intermediate system comprising the system of claim 13 for establishing the secure connection between the intermediate system and the remote system by establishing respective secure connections between the intermediate system and the second intermediate system and between the second intermediate system and the remote system.

18. The system of claim 13, wherein the change in operating conditions of the access system comprises a change in an address of the access system.

19. The system of claim 18, wherein the address of the access system comprises an Internet Protocol (IP) address.

20. The system of claim 18, wherein the processor is configured to detect a change in an address of the access system based on an address change notification received through the transceiver.

21. The system of claim 13, wherein the secure connection between the access system and the intermediate system comprises a connection through a first communication network, and wherein the processor is configured to detect a change in operating conditions of the access system based on a determination that a handoff of the connection from the first communication network to a second communication network is imminent.

22. The system of claim 21, wherein the determination that a handoff is imminent is made based on at least one of: a trigger for the handoff and a characteristic of a communication signal received from the access system through the transceiver.

23. The system of claim 13, wherein the secure connection between the access system and the intermediate system is established by negotiating security parameters to be used between endpoint addresses, the endpoint addresses comprising an address of the intermediate system and an address of the access system, wherein the change in operating conditions comprises a change in the address of the access system to a new access system address, and wherein the processor is configured to establish a new secure connection by updating the endpoint address of the access system to the new access system address.

24. The system of claim 23, further comprising:
a memory storing an identifier of the security parameters and the endpoint addresses,
wherein the processor is configured to update the endpoint address of the access system by storing in the memory the new access system address.

* * * * *